(12) United States Patent
Shen et al.

(10) Patent No.: US 12,308,695 B2
(45) Date of Patent: May 20, 2025

(54) UNINTERRUPTIBLE POWER SUPPLY

(71) Applicant: SANTAK ELECTRONIC (SHENZHEN) CO., LTD., Shenzhen (CN)

(72) Inventors: Zhimin Shen, Shenzhen (CN); Yanren Chen, Shenzhen (CN); Jun Yang, Shenzhen (CN)

(73) Assignee: Santak Electronic (Shenzhen) Co., Ltd., Shenzhen (CN)

( * ) Notice: Subject to any disclaimer, the term of this patent is extended or adjusted under 35 U.S.C. 154(b) by 131 days.

(21) Appl. No.: 18/187,865

(22) Filed: Mar. 22, 2023

(65) Prior Publication Data

US 2023/0307945 A1 Sep. 28, 2023

(30) Foreign Application Priority Data

Mar. 24, 2022 (CN) .......................... 202220658982.3

(51) Int. Cl.
H02J 9/06 (2006.01)
H02J 7/00 (2006.01)

(52) U.S. Cl.
CPC .......... *H02J 9/062* (2013.01); *H02J 7/00304* (2020.01)

(58) Field of Classification Search
None
See application file for complete search history.

(56) References Cited

U.S. PATENT DOCUMENTS

| | | | | |
|---|---|---|---|---|
| 2017/0025872 A1* | 1/2017 | Kang | .................. | H02J 7/00304 |
| 2017/0244277 A1* | 8/2017 | Blair | ..................... | H02H 7/125 |
| 2017/0353120 A1* | 12/2017 | Wei | ........................ | H02M 7/125 |
| 2018/0331569 A1* | 11/2018 | Pecorari | ................. | H02M 1/32 |
| 2023/0155412 A1* | 5/2023 | Di Filippi | ................ | H02J 7/34 |
| | | | | 429/9 |

* cited by examiner

Primary Examiner — Jared Fureman
Assistant Examiner — Joel Barnett
(74) Attorney, Agent, or Firm — Stanek Lemon Crouse & Meeks, PA

(57) ABSTRACT

The disclosure provides an uninterruptible power supply, including: an alternating current input terminal, configured to connect to mains electricity; an alternating current output terminal, configured to connect to a load; a rectifier and an inverter sequentially connected between the alternating current input terminal and the alternating current output terminal, where direct current buses are connected between the rectifier and the inverter; a capacitive element, connected between a positive electrode and a negative electrode of the direct current buses; a rechargeable battery and a bidirectional DC/DC converter, where the bidirectional DC/DC converter is connected between the rechargeable battery and the direct current buses; and a direct current bus charging and discharging module that includes a switch assembly and at least one resistor, the switch assembly including a discharging switch and at least one charging switch, where the at least one charging switch is configured to enable a power-supply source to precharge the direct current buses via the at least one resistor, and the discharging switch is configured to discharge, independently or in cooperation with the at least one charging switch, the direct current buses via the at least one resistor.

10 Claims, 5 Drawing Sheets

UNINTERRUPTIBLE POWER SUPPLY

CROSS-REFERENCE TO RELATED APPLICATIONS

The present application claims priority to Chinese Patent Application No. 202220658982.3; Filed Mar. 24, 2022, entitled AN UNINTERRUPTIBLE POWER SUPPLY that is incorporated herein by reference in its entirety.

TECHNICAL FIELD

The disclosure belongs to the field of electric power supplies, and particularly involves to an uninterruptible power supply.

BACKGROUND

As a power supply device that provides uninterrupted, high-quality, and reliable alternating current energy for a load, and has functions of real-time protection and monitoring of a power supply status, an uninterruptible power supply (UPS) plays a key role in improving power supply quality and ensuring a normal operation of a device. FIG. 1 is a circuit topology of a UPS in the prior art, which mainly includes a rectifier 101, an inverter 102, a battery B, and a bidirectional DC/DC converter 103. When input of mains electricity is normal, the mains electricity supplies power to the load via the rectifier 101 and the inverter 102, and stores electric energy for a storage device such as the battery B via the bidirectional DC/DC converter 103. When the mains electricity is interrupted, the UPS immediately switches to a battery mode for continual running. When the UPS is faulty, switching is performed to a bypass branch for continuing to supply power to the load, so as to implement uninterrupted power supply. Continuing to refer to FIG. 1, an input switch K1 and an output switch K3 are disposed between a phase line L1 of an alternating current input terminal and a phase line L2 of an alternating current output terminal. An input switch K2 and an output switch K4 are disposed between a neutral line N1 of the alternating current input terminal and a neutral line N2 of the alternating current output terminal. Switches K8 and K9 are disposed between the battery B and the bidirectional DC/DC converter 103. A capacitor C1 and a capacitor C2 are disposed between a positive direct current bus +BUS and a negative direct current bus −BUS between the rectifier 101 and the inverter 102. This type of UPS needs to precharge the direct current buses before starting, in other words, to charge the capacitors C1 and C2 between direct current buses, and the direct current buses need to be discharged after the UPS is powered off, in other words, the capacitors C1 and C2 need to be discharged. Currently, the mains electricity and a battery are usually used for precharging the direct current buses, and this is usually referred to as a "mains electricity and battery cold start function" of the UPS. As shown in FIG. 1, a precharging circuit includes diodes D1 and D2 at the alternating current input terminal, diodes D3 and D4 at positive and negative terminals of the battery B, a resistor R3 and a switch K5 that are disposed between the positive direct current bus +BUS and a positive electrode of the battery B, and a resistor R4 and a switch K6 that are disposed between the negative direct current bus −BUS and a negative electrode of the battery B. Before the UPS starts, the switches K5 and K6 are turned on first, and the mains electricity and the battery B charge the direct current buses simultaneously. Specifically, in a mains electricity charging circuit, a charging loop is formed by the input terminal phase line L1, the diode D1, the resistor R3, the capacitors C1 and C2, the resistor R4, the diode D2, and the neutral line N1 sequentially, so as to charge the capacitors C1 and C2. In a battery charging circuit, a charging loop is formed by the positive electrode of the battery B, the diode D3, the resistor R3, the capacitors C1 and C2, the resistor R4, the diode D4, and the negative electrode of the battery B sequentially, so as to charge the capacitors C1 and C2. For direct current bus discharging, as shown in FIG. 1, resistors R1 and R2 connected in series with each other are disposed, as a discharging circuit, between the positive direct current bus +BUS and the negative direct current bus −BUS. After the UPS is powered off, the energy stored in the bus capacitors C1 and C2 is released through the resistors R1 and R2 respectively. Specifically, electric charges on a positive electrode side of the capacitor C1 reach a negative electrode of the capacitor C1 through the resistor R1, and electric charges on a positive electrode side of the capacitor C2 reach a negative electrode of the capacitor C2 through the resistor R2. However, both the direct current bus precharging circuit and the direct current bus discharging circuit shown in FIG. 1 require specially disposed resistors while disposal of the resistors increases space occupation and power consumption of the UPS. Consequently, a size of the UPS is increased and efficiency of the UPS is reduced.

SUMMARY

In order to overcome defects of the prior art, the present disclosure provides an uninterruptible power supply, including:
- an alternating current input terminal, configured to connect to mains electricity;
- an alternating current output terminal, configured to connect to a load;
- a rectifier and an inverter sequentially connected between the alternating current input terminal and the alternating current output terminal, where direct current buses are connected between the rectifier and the inverter;
- a capacitive element, connected between a positive electrode and a negative electrode of the direct current buses;
- a rechargeable battery and a bidirectional DC/DC converter, where the bidirectional DC/DC converter is connected between the rechargeable battery and the direct current buses; and
- a direct current bus charging and discharging module that includes a switch assembly and at least one resistor, the switch assembly including a discharging switch and at least one charging switch, wherein the at least one charging switch is configured to enable a power-supply source to precharge the direct current buses via the at least one resistor, and the discharging switch is configured to discharge, independently or in cooperation with the at least one charging switch, the direct current buses via the at least one resistor.

Preferably, the power-supply source includes at least one of the mains electricity and the rechargeable battery.

Preferably, the power-supply source includes the mains electricity, and the direct current bus charging and discharging module further includes a rectifier circuit disposed between the alternating current input terminal and the switch assembly.

Preferably, the power-supply source further includes the rechargeable battery, and at least one unidirectional switch is disposed between the rechargeable battery and the switch assembly to prevent the mains electricity from reversely flowing to the rechargeable battery.

Preferably, the unidirectional switch is a diode.

Preferably, the at least one charging switch includes a first charging switch and a second charging switch, and two terminals of the discharging switch are respectively connected to one terminal of the first charging switch and one terminal of the second charging switch.

Preferably, the at least one resistor includes a first resistor and a second resistor, where the first charging switch and the first resistor are sequentially connected between a positive electrode of the power-supply source and the positive electrode of the direct current buses, and the second charging switch and the second resistor are sequentially connected between a negative electrode of the power-supply source and the negative electrode of the direct current buses.

Preferably, one terminal of the discharging switch is connected to a node between the first charging switch and the first resistor, and the other terminal of the discharging switch is connected to a node between the second charging switch and the second resistor.

Preferably, the switch assembly further includes a fuse element connected in series with the discharging switch.

Preferably, the charging switch and the discharging switch are mechanical switches.

Compared with the prior art, the present disclosure has the advantages of saving a quantity of resistors in use, reducing occupied space of the UPS, and improving work efficiency of the UPS.

BRIEF DESCRIPTION OF THE DRAWINGS

Embodiments of the present disclosure are further described below with reference to the accompanying drawings, in which.

DETAILED DESCRIPTION

To make an objective, technical solutions, and advantages of the present disclosure more clearly understood, the present disclosure is further described in detail below with reference to the accompanying drawings and specific embodiments. It should be understood that the specific embodiments described herein are only used to explain the present disclosure and are not intended to limit the present disclosure.

Figure 1:
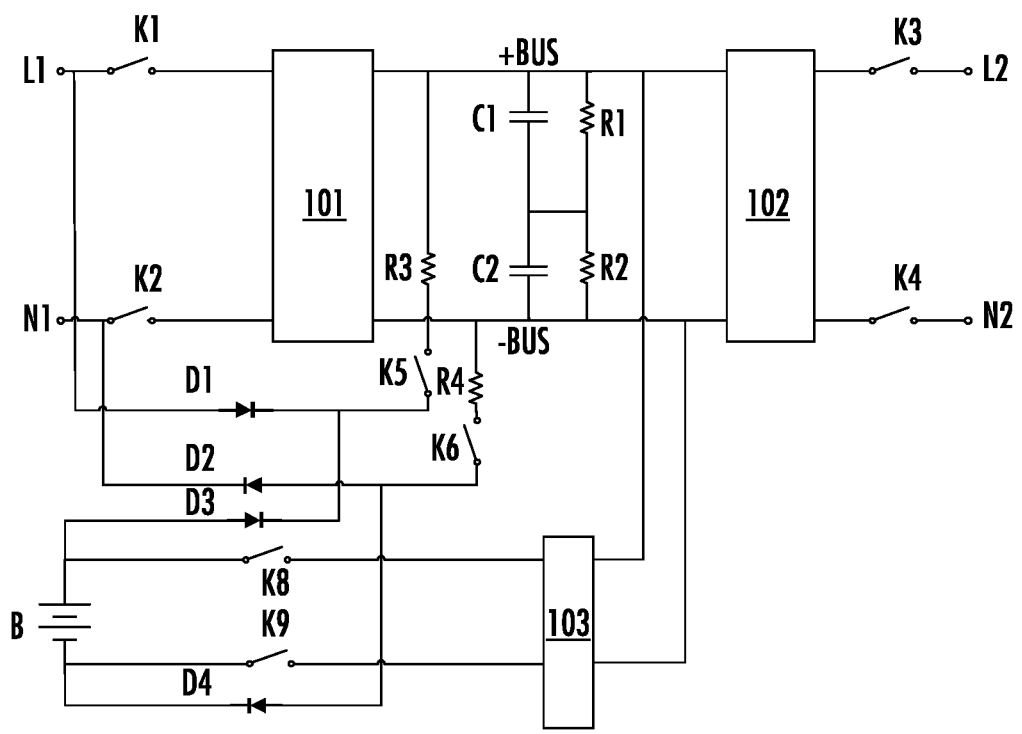
FIG. 1 is a circuit topology of a UPS in the prior art.
Figure 2:
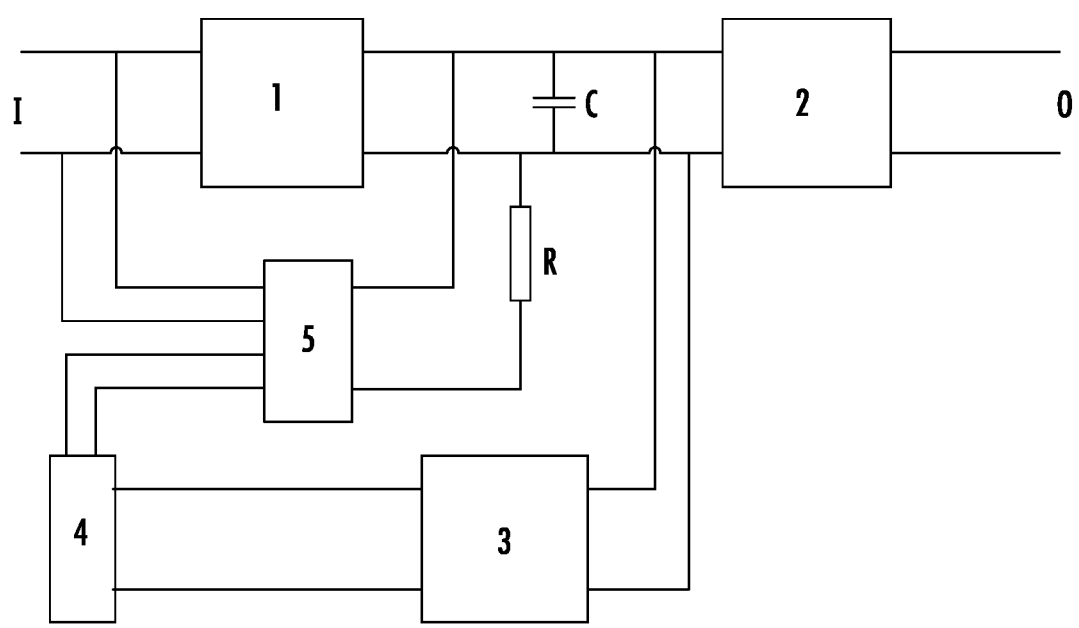
FIG. 2 is a block diagram of a structure of a UPS according to the present disclosure.

FIG. 2 is a block diagram of a structure of a UPS according to the present disclosure. The UPS in the present disclosure includes a rectifier 1 and an inverter 2 which are disposed between an alternating current input terminal I and an alternating current output terminal O. Direct current buses are connected between the rectifier 1 and the inverter 2, a capacitor C is connected between the positive and negative direct current buses, and a bidirectional DC/DC converter 3 is connected between the direct current buses and a rechargeable battery 4. In a mains electricity mode, mains electricity supplies power to a load via the rectifier 1 and the inverter 2, and charges the rechargeable battery 4 via the bidirectional DC/DC converter 3. In a battery mode, the rechargeable battery 4 supplies power to the load via the bidirectional DC/DC converter 3 and the inverter 2. Further, the UPS in the present disclosure further includes a switch assembly 5 and at least one resistor R, where the switch assembly 5 includes a charging switch and a discharging switch. When the charging switch is turned on, a power-supply source precharges the capacitor C via the at least one resistor R. When the discharging switch is turned on, the discharging switch enables, independently or in cooperation with the charging switch, the capacitor C and the at least one resistor R to form a loop, so that the capacitor C is discharged via the at least one resistor R. In the present disclosure, the precharging for the capacitor C between the positive and negative direct current buses is also referred to as "direct current bus precharging", and the discharging of the capacitor C is also referred to as "direct current bus discharging" accordingly. Preferably, the mains electricity or the rechargeable battery or the both precharge(s) the direct current buses directly via the at least one resistor R. If the direct current buses are precharged by the mains electricity, at least one rectifier diode needs to be disposed between the mains electricity and the switch assembly 5, and if the direct current buses are also charged by the rechargeable battery 4, a unidirectional switch needs to be disposed between the rechargeable battery 4 and the switch assembly 5, where a diode is preferably disposed, so as to ensure that there is no reverse current from the mains electricity to the rechargeable battery 4. Certainly, the direct current buses may be precharged by other power supplies. For example, the direct current buses are precharged by an auxiliary power supply in the uninterruptible power supply. The present disclosure has the advantages that a direct current bus charging circuit and discharging circuit of the uninterruptible power supply are shared, charging and discharging of the direct current buses are implemented through switching of different switches, the quantity of resistors is saved, occupied space of the UPS is reduced, and the work efficiency of the UPS is improved. The UPS of the present disclosure is described below through specific embodiments.

First Embodiment

Figure 3:
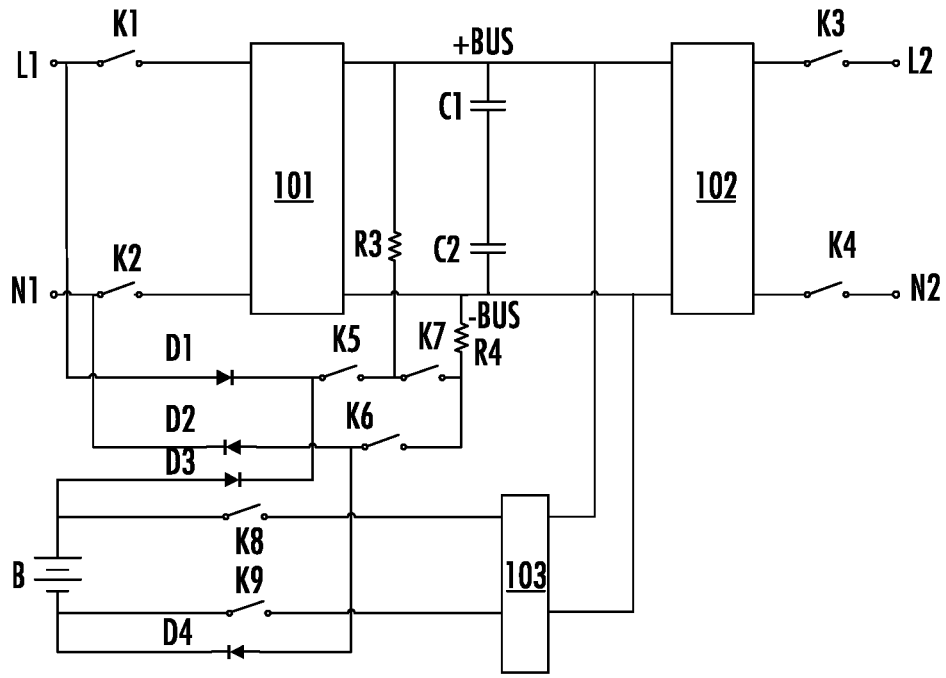
FIG. 3 is a circuit topology of a UPS according to a first embodiment of the present disclosure.

FIG. 3 shows a circuit topology of a UPS according to a first embodiment of the present disclosure. The UPS includes an alternating current input terminal, an alternating current output terminal, and a rectifier 101 and an inverter 102 that are connected between the alternating current input terminal and the alternating current output terminal, where a phase line input switch K1 and a neutral line input switch K2 are disposed between an input terminal of the rectifier 101 and the alternating current input terminal, a phase line output switch K3 and a neutral line output switch K4 are disposed between an output terminal of the inverter 102 and the alternating current output terminal, and a first capacitor C1 and a second capacitor C2 connected in series with each other are disposed between a positive direct current bus +BUS and a negative direct current bus −BUS between the rectifier 101 and the inverter 102. In addition, the UPS further includes a rechargeable battery B and a bidirectional DC/DC converter 103. First DC terminals of the bidirectional DC/DC converter 103 are connected to the positive direct current bus +BUS and the negative direct current bus −BUS, and second DC terminals thereof connected to two terminals of the rechargeable battery B. The bidirectional DC/DC converter 103 can convert a direct current voltage output from the rectifier 101 for charging the rechargeable battery B, and can convert a direct current voltage from the rechargeable battery B and provide the converted voltage for the converter 102, so that the inverter 102 performs conversion to obtain an alternating current voltage to supply power to a load. A switch K8 is disposed between a positive electrode of the rechargeable battery B and a positive terminal of the bidirectional DC/DC converter 103, and a switch K9 is disposed between a negative electrode of the rechargeable battery B and a negative terminal of the bidirectional DC/DC converter 103. In addition, the UPS in this embodiment further includes a direct current bus charging and discharging module. The module includes a battery terminal diode D3, a charging switch K5, and a resistor R3 that are sequentially connected in series between the positive electrode of the rechargeable battery B and the positive direct current bus +BUS, a battery terminal diode D4, a charging switch K6, and a resistor R4 that are sequentially connected in series between the negative electrode of the rechargeable battery B and the negative direct current bus −BUS, and a discharging switch K7. A positive electrode of the diode D3 is connected to the positive electrode of the rechargeable battery B. A negative electrode of the diode D4 is connected to the negative electrode of the rechargeable battery B. One terminal of the switch K7 is connected to a node between the resistor R3 and the switch K5, and the other terminal is connected to a node between the resistor R4 and the switch K6. Further, the direct current bus charging and discharging module in this embodiment further includes mains electricity terminal diodes D1 and D2. A positive electrode of the diode D1 is connected to a phase line L1 of the alternating current input terminal, and a negative electrode thereof is connected to a node between the diode D3 and the switch K5. A positive electrode of the diode D2 is connected to a node between the diode D4 and the switch K6, and a negative electrode thereof is connected to a neutral line N1 of the alternating current input terminal. In this embodiment, the mains electricity terminal diodes D1 and D2 are used for rectification. A person skilled in the art can understand that other rectifier circuits known in the art can be adopted for this disclosure. The battery terminal diodes D3 and D4 are used to prevent mains electricity from reversely flowing to the rechargeable battery B in a precharging process. Similarly, it is not necessary to use two diodes to prevent the mains electricity from reversely flowing, and one diode or more than two diodes can also be adopted.

Operating modes of the UPS in this embodiment are as follows.

Figure 4:
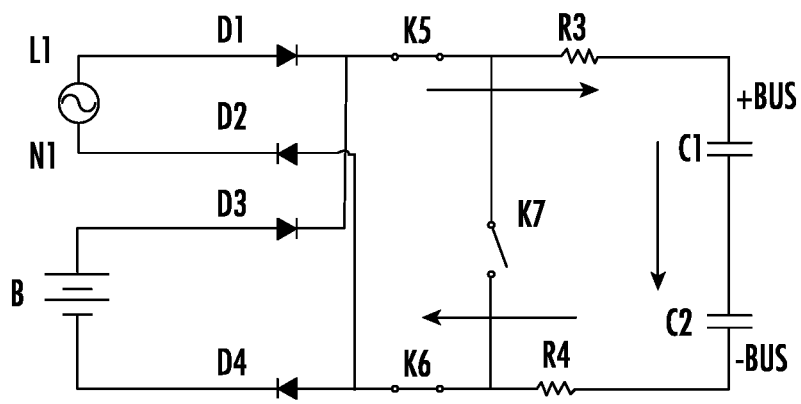
FIG. 4 shows a direct current bus precharging circuit of a UPS according to a first embodiment of the present disclosure.

Direct Current Bus Precharging Mode:

Before the UPS starts, the direct current buses are firstly precharged. The switches K5 and K6 are turned on and the switches K1, K2, K3, K4, K7, K8, and K9 are turned off. In this case, the mains electricity is rectified by the diodes D1 and D2 and then charges the first capacitor C1 and the second capacitor C2 via R3 and R4, and the battery B charges the first capacitor C1 and the second capacitor C2 through the diodes D3 and D4 and R3 and R4. In this way, the direct current buses are precharged, and a charging loop is shown in FIG. 4. After the precharging, the switches K1, K2, K3, and K4 are turned on, and the UPS completely starts.

Mains Electricity Mode:

The mains electricity supplies power to the load through an inverter branch. Specifically, the rectifier 101 converts mains electricity alternating current input into direct current output, and the inverter 102 converts the direct current output from the rectifier 101 into stable alternating current output provided for the load. Meanwhile, the mains electricity charges the rechargeable battery B via the bidirectional DC/DC converter 103.

Battery Mode:

When the mains electricity is faulty, the rechargeable battery B supplies power to a load 1 independently. In this case, the bidirectional DC/DC converter 103 converts a less stable direct current from the rechargeable battery B into stable direct current output, and then the inverter 102 converts the stable direct current output into alternating current output provided for the load.

Bypass Mode:

When the UPS is faulty, the mains electricity directly supplies power to the load through a bypass branch.

Figure 5:
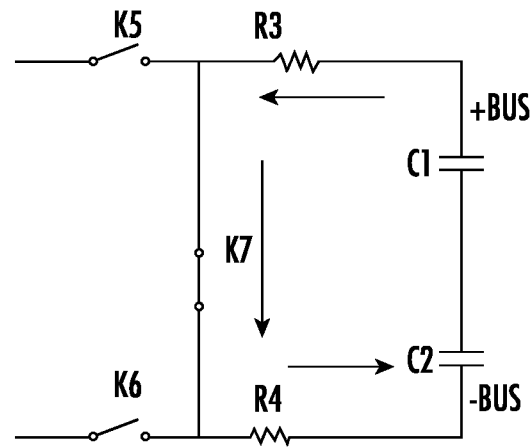
FIG. 5 shows a direct current bus discharging circuit of a UPS according to a first embodiment of the present disclosure.

Direct Current Bus Discharging Mode:

The switches K1 to K4 are turned off, and the UPS stops operating. In this case, the switches K5 and K6 are turned off, and the switch K7 is turned on. In this case, electric energy stored in the first capacitor C1 and the second capacitor C2 is released through the resistor R3 and the resistor R4. A discharging loop is shown in FIG. 5.

In FIG. 3, two terminals of the switch K7 in a switch assembly are respectively connected to a right terminal of the switch K5 and a right terminal of the switch K6. A person skilled in the art can understand that the two terminals of the switch K7 can alternatively be respectively connected to a left terminal of the switch K5 and a left terminal of the switch K6, be respectively connected to a left terminal of the switch K5 and the right terminal of the switch K6, or be respectively connected to the right terminal of the switch K5 and the left terminal of the switch K6. That is, the two terminals of the switch K7 are respectively connected to a terminal of the switch K5 and a terminal of the switch K6, and there is no specific limit to which terminal is connected. A difference lies in that in the direct current bus discharging mode, logic of turning off or turning on the switches K5, K6, and K7 is different, with a purpose of enabling the capacitors C1 and C2 and the resistors R3 and R4 to form the loop. For example, if the two terminals of the switch K7 are respectively connected to the left terminal of the switch K5 and the left terminal of the switch K6, in the direct current bus discharging mode, the switches K5, K6, and K7 are all turned on, in other words, the discharging switch K7 and the charging switches K5 and K6 cooperate to enable the direct current buses to discharge via the resistor R3 and the resistor R4.

Second Embodiment

Figure 6:
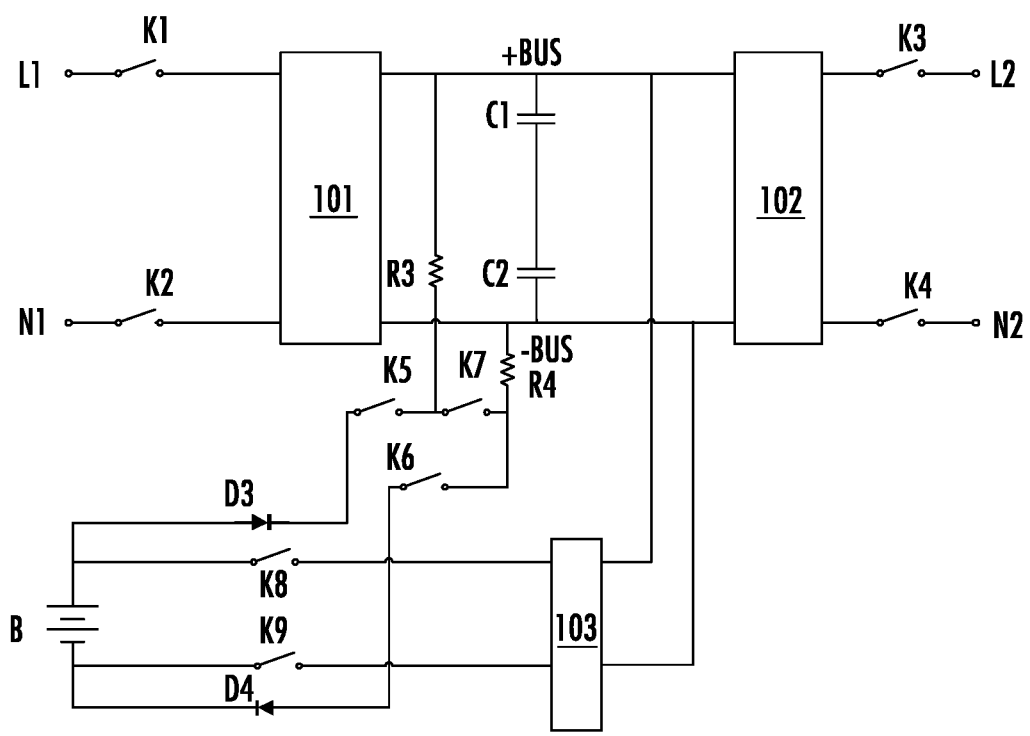
FIG. 6 is a circuit topology of a UPS according to a second embodiment of the present disclosure.

FIG. 6 is a circuit topology of a UPS according to a second embodiment of the present disclosure. Comparing with the circuit topology of the UPS in the first embodiment, the circuit topology in the second embodiment cancels the mains electricity precharging and precharges the direct current buses with the battery only. Specifically, before the UPS starts, direct current buses are firstly precharged. Switches K5 and K6 are turned on and switches K1, K2, K3, K4, K7, K8, and K9 are turned off. In this case, a battery B charges a first capacitor C1 and a second capacitor C2 through diodes D3 and D4 and R3 and R4. In this way, the direct current buses are precharged. A person skilled in the art can understand that, in this embodiment, because mains electricity does not participate in precharging, the diodes D3 and D4 are not necessary and may be removed.

Third Embodiment

Figure 7:
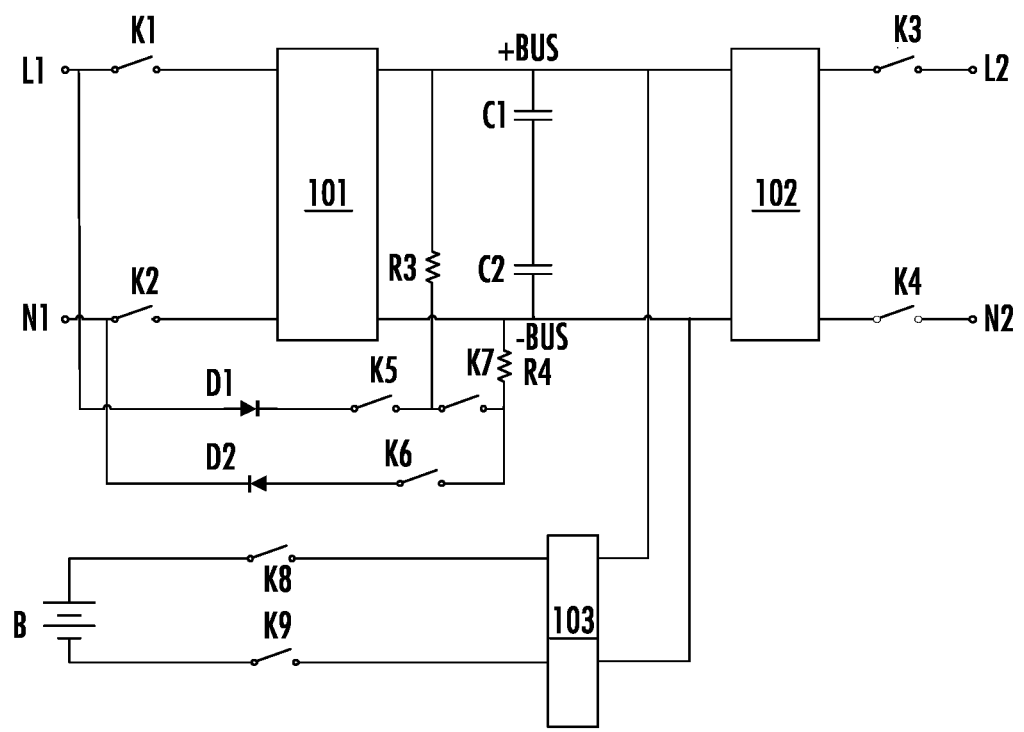
FIG. 7 is a circuit topology of a UPS according to a third embodiment of the present disclosure.

FIG. 7 is a circuit topology of a UPS according to a third embodiment of the present disclosure. Comparing with the circuit topology of the UPS in the first embodiment, the circuit topology in the third embodiment cancels the battery precharging and precharges the direct current buses with mains electricity only. Specifically, before the UPS starts, direct current buses are firstly precharged. Switches K5 and K6 are turned on and switches K1, K2, K3, K4, K7, K8, and K9 are turned off. In this case, the mains electricity is rectified by diodes D1 and D2 and then charges a first capacitor C1 and a second capacitor C2 via R3 and R4. In this way, the direct current buses are precharged.

In the present disclosure, the switch K7 shown in FIG. 2 to FIG. 7 may also be connected in series with a fuse element to improve safety. In addition, the switch K7 needs to meet a system requirement of the UPS.

The switch in the present disclosure can use any switch element known in the art, such as a mechanical switch, a relay, or a contactor.

In the present disclosure, the resistor R3 and the resistor R4 may also be replaced by resistor elements known in the art, and may also be implemented by a plurality of resistors, such as a series circuit composed of a plurality of resistors.

In the present disclosure, the first capacitor and the second capacitor may alternatively use a separate capacitor or more than two capacitors.

Embodiments of the present disclosure have been described in terms of the preferred embodiment. However, the present disclosure is not limited to embodiments described herein, and also includes various equivalents, alternatives, and modifications made without departing from the scope of the present disclosure.

What is claimed is:

1. An uninterruptible power supply, comprising:
   an alternating current input terminal, configured to connect to mains electricity;
   an alternating current output terminal, configured to connect to a load;
   a rectifier and an inverter sequentially connected between the alternating current input terminal and the alternating current output terminal, wherein direct current buses are connected between the rectifier and the inverter;
   a capacitive element, connected between a positive electrode and a negative electrode of the direct current buses;
   a rechargeable battery and a bidirectional DC/DC converter, wherein the bidirectional DC/DC converter is connected between the rechargeable battery and the direct current buses; and
   a direct current bus charging and discharging module, comprising a switch assembly and at least one resistor, the switch assembly comprising a discharging switch and at least one charging switch, wherein the at least one charging switch is configured to enable a power-supply source to precharge the direct current buses via the at least one resistor, and the discharging switch is configured to discharge, independently or in cooperation with the at least one charging switch, the direct current buses via the at least one resistor.

2. The uninterruptible power supply of claim 1, wherein the power-supply source comprises at least one of the mains electricity and the rechargeable battery.

3. The uninterruptible power supply of claim 2, wherein the power-supply source comprises the mains electricity, and the direct current bus charging and discharging module further comprises a rectifier circuit disposed between the alternating current input terminal and the switch assembly.

4. The uninterruptible power supply of claim 3, wherein the power-supply source further comprises the rechargeable battery, and at least one unidirectional switch is disposed between the rechargeable battery and the switch assembly to prevent the mains electricity from reversely flowing to the rechargeable battery.

5. The uninterruptible power supply of claim 4, wherein the unidirectional switch is a diode.

6. The uninterruptible power supply of claim 1, herein the at least one charging switch comprises a first charging switch and a second charging switch, and two terminals of the discharging switch are respectively connected to one terminal of the first charging switch and one terminal of the second charging switch.

7. The uninterruptible power supply of claim 6, wherein the at least one resistor comprises a first resistor and a second resistor, where the first charging switch and the first resistor are sequentially connected between a positive electrode of the power-supply source and the positive electrode of the direct current buses, and the second charging switch and the second resistor are sequentially connected between a negative electrode of the power-supply source and the negative electrode of the direct current buses.

8. The uninterruptible power supply of claim 7, wherein one terminal of the discharging switch is connected to a node between the first charging switch and the first resistor, and the other terminal of the discharging switch is connected to a node between the second charging switch and the second resistor.

9. The uninterruptible power supply of claim 1, wherein the switch assembly further comprises a fuse element connected in series with the discharging switch.

10. The uninterruptible power supply of claim 1, wherein the charging switch and the discharging switch are mechanical switches.

* * * * *